US009476497B2

(12) United States Patent
Liu

(10) Patent No.: US 9,476,497 B2
(45) Date of Patent: Oct. 25, 2016

(54) UNIDIRECTIONAL CLUTCH DECOUPLING DEVICE FOR TRANSFERRING TORQUE BETWEEN BELT WHEEL AND SHAFT

(71) Applicant: Ningbo Yangtong Automobile Parts Co., Ltd, Ningbo (CN)

(72) Inventor: Zenggang Liu, Ningbo (CN)

(73) Assignee: Ningbo Yangtong Automobile Parts Co., Ltd, Ningbo (CN)

( * ) Notice: Subject to any disclaimer, the term of this patent is extended or adjusted under 35 U.S.C. 154(b) by 57 days.

(21) Appl. No.: 14/586,382

(22) Filed: Dec. 30, 2014

(65) Prior Publication Data

US 2015/0308556 A1    Oct. 29, 2015

(30) Foreign Application Priority Data

Apr. 23, 2014   (CN) .......................... 2014 1 0163988
Apr. 23, 2014   (CN) .......................... 2014 2 0198755

(51) Int. Cl.
| | |
|---|---|
| F16H 9/00 | (2006.01) |
| F16H 59/00 | (2006.01) |
| F16H 61/00 | (2006.01) |
| F16H 63/00 | (2006.01) |
| F16D 3/00 | (2006.01) |
| F16H 55/14 | (2006.01) |
| F16H 55/36 | (2006.01) |
| F16D 3/12 | (2006.01) |
| F16D 3/52 | (2006.01) |
| F16D 41/20 | (2006.01) |
| F02B 67/06 | (2006.01) |

(52) U.S. Cl.
CPC ............. *F16H 55/36* (2013.01); *F02B 67/06* (2013.01); *F16D 3/12* (2013.01); *F16D 3/52* (2013.01); *F16D 41/206* (2013.01); *F16D 2300/22* (2013.01); *F16H 2055/366* (2013.01)

(58) Field of Classification Search
CPC ............. F16H 55/36; F16H 2055/366; F16D 41/206; F16D 7/022; F02B 67/06
USPC ...................................................... 474/94, 70
See application file for complete search history.

(56) References Cited

U.S. PATENT DOCUMENTS

| | | | | |
|---|---|---|---|---|
| 5,517,957 | A * | 5/1996 | Wagner | F02B 67/06 123/192.1 |
| 5,540,626 | A * | 7/1996 | Asai | F16F 15/124 474/178 |
| 5,591,093 | A * | 1/1997 | Asai | F16D 3/76 474/902 |
| 6,083,130 | A * | 7/2000 | Mevissen | F02B 67/06 192/107 T |
| 6,237,736 | B1 * | 5/2001 | Ouchi | F16D 41/064 192/41 R |
| 6,761,656 | B2 * | 7/2004 | King | F16D 41/206 474/74 |
| 7,150,679 | B2 * | 12/2006 | Pape | F16F 15/126 464/17 |
| 7,712,592 | B2 * | 5/2010 | Jansen | F16D 3/52 192/41 S |

(Continued)

*Primary Examiner* — Henry Liu
(74) *Attorney, Agent, or Firm* — McDonnell, Boehnen, Hulbert & Berghoff, LLP

(57) ABSTRACT

The patent application discloses a unidirectional clutch decoupling device for transferring torque between a belt wheel and a shaft. The unidirectional clutch decoupling device includes a friction spring, an outer ring, a shaft sleeve and an elastic unit. The friction spring is combined with the inner surface of the belt wheel in a rubbing mode. The outer ring is arranged in the space formed by the friction spring. The relative position of the outer ring and the friction spring is fixed. The shaft sleeve is used for accommodating the shaft, and the relative position of the shaft sleeve and the shaft is fixed. The elastic unit is located between the outer ring and the shaft sleeve and used for transferring torque of the outer ring to the shaft sleeve.

20 Claims, 3 Drawing Sheets

(56) References Cited

U.S. PATENT DOCUMENTS

| | | | | |
|---|---|---|---|---|
| 7,766,774 B2* | 8/2010 | Antchak | F16D 7/022 | 192/41 S |
| 7,798,928 B2* | 9/2010 | Serkh | F02B 67/06 | 474/152 |
| 7,803,056 B2* | 9/2010 | Nosaka | F16D 7/02 | 464/30 |
| 7,850,557 B2* | 12/2010 | Moriya | F16H 55/36 | 464/90 |
| 7,975,821 B2* | 7/2011 | Antchak | F16D 7/022 | 192/41 S |
| 8,132,657 B2* | 3/2012 | Antchak | F16D 7/022 | 192/41 S |
| 8,177,669 B2* | 5/2012 | Ishida | F16D 41/206 | 474/166 |
| 8,202,183 B2* | 6/2012 | Riu | F16D 41/203 | 474/70 |
| 8,262,520 B2* | 9/2012 | Shimamura | F16D 3/12 | 464/71 |
| 8,506,434 B2* | 8/2013 | Harvey | F16D 47/02 | 192/41 R |
| 8,678,157 B2* | 3/2014 | Ward | F16D 7/022 | 192/41 R |
| 8,715,121 B2* | 5/2014 | Cali | F16D 3/02 | 474/94 |
| 8,813,928 B2* | 8/2014 | Schneider | F16D 7/022 | 192/41 S |
| 8,820,503 B2* | 9/2014 | Schneider | F16D 41/206 | 192/41 S |
| 8,888,619 B2* | 11/2014 | Antchak | F16D 7/022 | 474/74 |
| 9,181,989 B2* | 11/2015 | Mevissen | F02B 67/06 | |
| 2002/0183147 A1* | 12/2002 | Fujiwara | F16H 55/36 | 474/70 |
| 2005/0215366 A1* | 9/2005 | Serkh | F02B 67/06 | 474/74 |
| 2005/0250607 A1* | 11/2005 | Jansen | F02B 67/06 | 474/74 |
| 2006/0154763 A1* | 7/2006 | Serkh | F02B 67/06 | 474/59 |
| 2012/0172163 A1* | 7/2012 | Fitz | F16F 15/1245 | 474/94 |
| 2015/0276039 A1* | 10/2015 | Williams | F16D 41/206 | 474/94 |

* cited by examiner

UNIDIRECTIONAL CLUTCH DECOUPLING DEVICE FOR TRANSFERRING TORQUE BETWEEN BELT WHEEL AND SHAFT

CROSS REFERENCE TO RELATED PATENT APPLICATIONS

The present patent application claims priority of Chinese patent application No. 201410163988.3 filed on Apr. 23, 2014, the entire contents of which are incorporated by reference.

FIELD OF TECHNOLOGY

The present patent application relates to a mechanical component unit which transfers the torque of motor vehicle engine to the alternator through the belt wheel, and particularly relates to a unidirectional clutch decoupling device for transferring torque between a belt wheel and a shaft.

BACKGROUND

Motor vehicle engine use a loop serpentine belt to transfer part of the engine output to a plurality of belt drive attachments. Each component includes an input drive shaft and a belt wheel connected to a far end of the input drive shaft. The belt wheel is used to drive the belt. The torque produced by the engine is transferred to the belt wheel through the belt. The belt wheel drives the drive shaft of the alternator to rotate, in order to produce the alternating current by driving a mover to cut magnetic loop.

Most of the motor vehicle engines drive the piston moving up-and-down through the combustion of fuel oil or gas. The combustion makes the crankshaft accelerate and the compression makes the crankshaft decelerate. So the belt drive attachment is repeatedly accelerated and decelerated. In the process, the belt wheel drives the whole gear system (including generator, water pump, air condition, idler, and etc.) and produces larger vibration. This causes some bad effects, such as the increase of the engine vibration, noise and fuel consumption, and the decrease of the component life and vehicle comfort. In order to solve the above problem, a unidirectional clutch decoupling device (overrunning alternator decoupler), used for reducing and eliminating the vibration of the engine gear train, is provided.

U.S. Pat. No. 5,139,463 discloses a serpentine drive with coil spring alternator connection. In U.S. Pat. No. 5,139,463, a plastic bracket is used to connect the friction spring and the torsion spring in series. Part of the belt wheel vibration is absorbed by the torsion spring through deformation. The disadvantage of the above includes: first, the processing technique is difficult when the friction springs and torsion springs are connected in series, the docking accuracy is difficult to guarantee; second, the inner surface of T wheel needs to be milled a spiral stairs to fix the torsional spring, which leads to a low efficiency and high cost.

Accordingly, a new unidirectional clutch decoupling device is needed.

SUMMARY

In order to solve the deficiency of the existing technology, the present patent application provides a unidirectional clutch decoupling device for transferring torque between a belt wheel and a shaft. The unidirectional clutch decoupling device can effectively absorb the vibration of the belt wheel with a compact structure.

The unidirectional clutch decoupling device includes a friction spring, an outer ring, a shaft sleeve and an elastic unit. The friction spring is combined with the inner surface of the belt wheel in a rubbing mode. The outer ring is arranged in the space formed by the friction spring. The relative position of the outer ring and the friction spring is fixed. The shaft sleeve is used for accommodating the shaft, and the relative position of the shaft sleeve and the shaft is fixed. The elastic unit is located between the outer ring and the shaft sleeve and used for transferring torque of the outer ring to the shaft sleeve. When the outer ring drives the shaft sleeve to rotate, the elastic unit reduces or eliminates rotation vibration of the outer ring and the shaft sleeve through deformation.

In one embodiment of the present patent application, an inner surface of the outer ring comprises at least one convex plate; an outer surface of the shaft sleeve comprises at least one convex plate; the elastic unit is fixed by the convex plates of the outer ring and the convex plates of the shaft sleeve.

In one embodiment of the present patent application, the elastic unit is a serpentine spring.

In one embodiment of the present patent application, the outer surface of the outer ring comprises a groove which is used for accommodating an end of the friction spring which bends inwards.

In one embodiment of the present patent application, the unidirectional clutch decoupling device further comprises at least one cushion block located between the outer ring and the shaft sleeve; and the cushion block is used for adjusting a deformation range of the elastic unit.

In one embodiment of the present patent application, the convex plate of the outer ring axially parallels to the convex plate of the shaft sleeve.

In one embodiment of the present patent application, the elastic unit is made of a metal strip which bends along a first direction of a plane and a second opposite the first direction along a plane, each of the convex plates of the outer ring and each of the convex plates of the shaft sleeve are arranged in a U unit of the elastic unit.

In one embodiment of the present patent application, the unidirectional clutch decoupling device further comprises at least one cushion block located between the outer ring and the shaft sleeve, the number of the convex plates of the shaft sleeve is double the number of the convex plates of the outer ring, and each of the convex plates of the outer ring and each of the cushion blocks are alternately arranged in each two adjacent U unit.

In one embodiment of the present patent application, the number of the convex plates of the shaft sleeve is equal to the number of the convex plates of the outer ring; each of the convex plates of the shaft sleeve and each of the convex plates of the outer ring are arranged in one of two adjacent U units and the cushion block is arranged in another one of two adjacent U units.

In one embodiment of the present patent application, the cushion block is made of at least one from the group comprising plastic, composite material or metal material.

In one embodiment of the present patent application, the belt wheel rotates relative to the shaft sleeve through two antifriction bearings, the two antifriction bearings are respectively arranged on both ends of the unidirectional clutch decoupling device.

In one embodiment of the present patent application, the outer ring comprises a step used for blocking the friction spring.

In one embodiment of the present patent application, the end of the friction spring which bends inwards contacts with the elastic unit and is used for transferring torque from the inner surface of the belt wheel to the elastic unit.

In one embodiment of the present patent application, the outer ring is made of at least one from the group comprising plastic, composite material or metal material.

Compared with the existing technology, the unidirectional clutch decoupling device in the present patent application transfers torque and eliminates vibration by a serpentine spring. The structure is simple. It greatly reduces the difficulties of manufacturing process. The outer ring is a connecting piece between the friction spring and the shaft sleeve. A groove is set in the outer surface of the outer ring and used to embed and fix the friction spring. The processing step of milling the inner surface of T wheel to a spiral stair can be avoided. The materials of the outer ring can be at least one selected from the group includes plastic, composite material, and metal material. Compared with the existing technology, the processing method is simpler and the manufacturing cost reduces greatly. In addition, in the existing technology, one end of the unidirectional clutch decoupling device is a metal antifriction bearing and the other end of the unidirectional clutch decoupling device is plastic support. Since the tolerances of the metal and plastic are inconformity, the unidirectional clutch decoupling device wears out easily when rotating. Two ends of the unidirectional clutch decoupling device in the present patent application are metal bearings. The stress of the two ends is distributed evenly. Compared with the existing technology, the unidirectional clutch decoupling device in the present patent application has a longer operation life of and reliable quality.

BRIEF DESCRIPTION OF THE DRAWINGS

Embodiments in accordance with this disclosure will now be described, by non-limiting example only, with reference to the accompanying drawings, in which.

DETAILED DESCRIPTION

Figure 1:
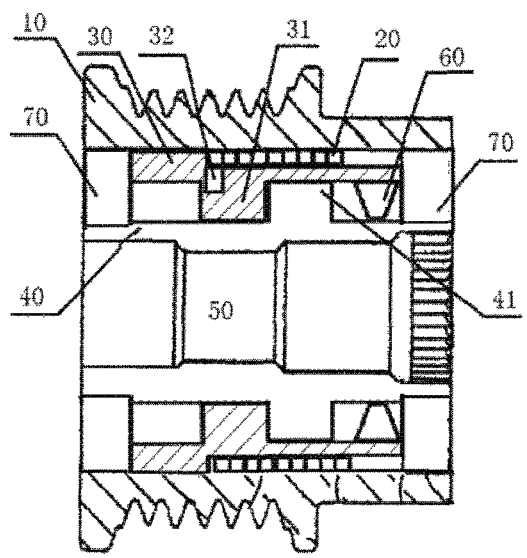
FIG. 1 is a side view of a unidirectional clutch decoupling device according to an embodiment of the present patent application.

Reference will now be made in detail to an embodiment of the unidirectional clutch decoupling device disclosed in the present patent application, examples of which are also provided in the following description. Exemplary embodiments of the unidirectional clutch decoupling device disclosed in the present patent application are described in detail, although it will be apparent to those skilled in the relevant art that some features that are not particularly important to an understanding of the unidirectional clutch decoupling device may not be shown for the sake of clarity.

Furthermore, it should be understood that the unidirectional clutch decoupling device disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

The present patent application provides a unidirectional clutch decoupling device used for transferring torque between a belt wheel and a shaft. The unidirectional clutch decoupling device can effectively absorb the vibration of the belt wheel and its structure is more compact.

The unidirectional clutch decoupling device includes a friction spring, an outer ring, a shaft sleeve and an elastic unit. The friction spring is combined with the inner surface of the belt wheel in a rubbing mode. The outer ring is arranged in the space formed by the friction spring. The relative position of the outer ring and the friction spring is fixed. The shaft sleeve is used for accommodating the shaft, and the relative position of the shaft sleeve and the shaft is fixed. The elastic unit is located between the outer ring and the shaft sleeve and used for transferring torque of the outer ring to the shaft sleeve. When the outer ring drives the shaft sleeve to rotate, the elastic unit reduces or eliminates rotation vibration of the outer ring and the shaft sleeve through deformation. The term rotation vibration refers to a vibration caused by inhomogeneity of speed and torque of the outer ring and shaft sleeve.

In order to clearly show the structure and operation of the present patent application, many directional words will be used to describe in the following description. However, the terms "front", "back", "left", "right", "outside", "inside", "outward", "inward", "up" and "down" are convenient words in order to facilitate comprehension, and should not be interpreted as limiting words. In addition, "inside" refers to the direction near the generator drive shaft. "Outside" refers to the direction away from the generator drive shaft. "Axial direction" refers to the direction parallel to the generator drive shaft. "Radial direction" refers to the direction perpendicular to the generator drive shaft.

FIG. 1 is a side view of a unidirectional clutch decoupling device according to an embodiment of the present patent application. The unidirectional clutch decoupling device in the present patent application includes: a belt wheel 10, a friction spring 20, an outer ring 30, an elastic element 60 and a shaft sleeve 40. The most outer surface of the belt wheel 10 includes a plurality of V grooves. The V grooves are used to couple with the belt (not shown in the Figures). When the belt is rotating, the belt drives the belt wheel 10 to rotate. The friction spring 20 is located in the belt wheel 10.

The friction spring includes a plurality of spiral coils. The cross sectional shape of the friction spring is not a circle. The friction spring 20 is arranged in the belt wheel 10. The friction spring 20 contacts with the inner surface of the belt wheel 10. The tension of the friction spring 20 is limited by the inner surface of the belt wheel 10 and the damping between the friction spring 20 and the belt wheel 10. The friction spring 20 and the belt wheel 10 can only move relatively in one direction. In the opposite direction, the friction spring 20 contracts in the radial direction, and the braking between the friction spring 20 and the belt wheel 10 is relieved. It means that when the belt wheel 10 moves faster, the friction spring 20 and the belt wheel rotate in the same direction. When the belt wheel 10 moves slower, the friction spring 20 doesn't rotate with the rotation direction of the belt wheel.

The outer ring 30 is arranged in the friction spring 20. The outer ring 30 and the inner surface of the friction spring 20 keep a certain gap, so as to adapt to the radial dimension changing of the friction spring 20. The outer ring 30 is in a cylinder shape. A serpentine spring 60 is located in the outer ring 30. The outer ring 30 transfers the torque to the shaft sleeve 40 located at an inner side of the serpentine spring 60.

A first end of the friction spring 20 contacts with the inner surface of the belt wheel 10. A second end of the friction spring 20 bends inwards. The second end of the friction spring 20 is embedded into the groove of the outer surface of the outer ring 30, so that the friction spring 20 is fixed to the outer ring 30. One end of the outer ring 30 is designed to have a step shape. It bulges outward and passes through the space where the inner surface of the friction spring 20 locates. This limits the location of the friction spring 20. The second end of the friction spring 20 contacts with the serpentine spring 60 and directly transfers the torque to the serpentine spring 60.

Figure 2:
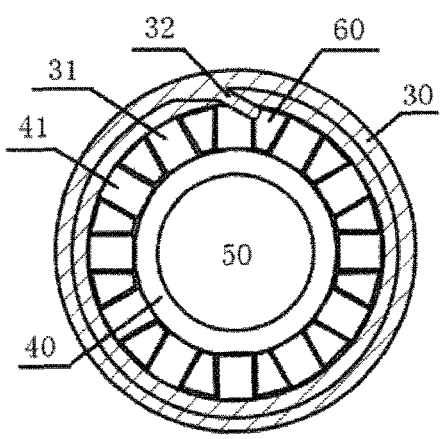
FIG. 2 is a cross-section view of the unidirectional clutch decoupling device according to an embodiment of the present patent application.
Figure 3:
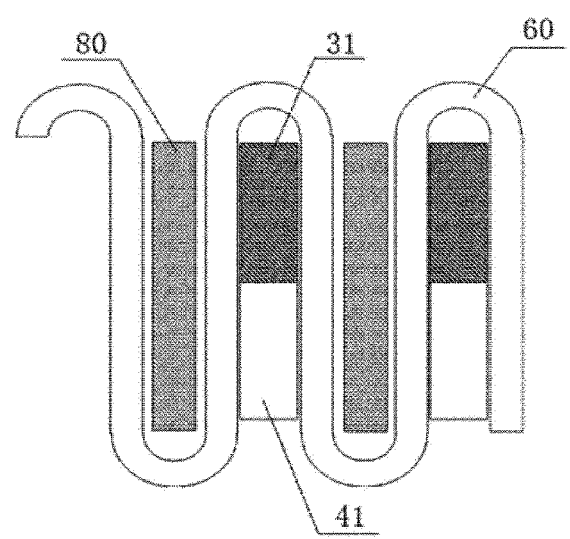
FIG. 3 illustrates a connection method of the elastic element of the unidirectional clutch decoupling device according to an embodiment of the present patent application.

The drive shaft 50 located at the innermost of the generator is fixed to the shaft sleeve 40. The shaft sleeve 40 and the outer ring 30 transfer torque by the serpentine spring 60. The specific connections are shown in FIG. 2 and FIG. 3. The serpentine spring 60 is made of a metal strip which bends along a first direction of a plane and a second opposite the first direction along the plane. The serpentine spring 60 can be seen as a spring including a plurality of U units. The inner surface of the outer ring 30 includes a plurality of convex plates 31. The outer surface of the shaft sleeve 40 also includes a plurality of convex plates 41. The serpentine spring 60 is embedded between the convex plates 31 and convex plates 41. The serpentine spring 60 contacts with the outer ring 30 and shaft sleeve 40 by convex plate 31 and convex plate 41. The outer ring 30 and shaft sleeve 40 are fixed together by the serpentine spring 60. When the outer ring 30 rotates, the torque is transferred to the shaft sleeve 40 by the serpentine spring 60. The serpentine spring 60 transfers the torque of the belt wheel 10 to the shaft sleeve 40 via the outer ring 30, and then transfers to the drive shaft 50 of the generator ultimately. This eliminates the vibration of the belt wheel 10 during its rotation. The vibration is blocked between the outer ring 30 and the shaft sleeve 40. Thus, eliminating the vibration of the drive shaft 50 of the generator can be achieved. When the serpentine spring 60 receives the vibration from the radial direction, each U unit is squeezed and the bending angle of the U unit changes. So, the vibration is absorbed and only the torque is transferred. Optional, the convex plates 31 of the outer ring 30 are evenly distributed on the inner surface of the outer ring 30. The convex plates 41 of the shaft sleeve 40 are distributed on the outer surface of the shaft sleeve 40. The number of the convex plates 41 of the shaft sleeve 40 is the same as the number of the convex plates 31 of the outer ring 30. The location distribution of the convex plates 41 of the shaft sleeve 40 them is also consistent with that of the convex plates 31 of the outer ring 30.

Figure 4:
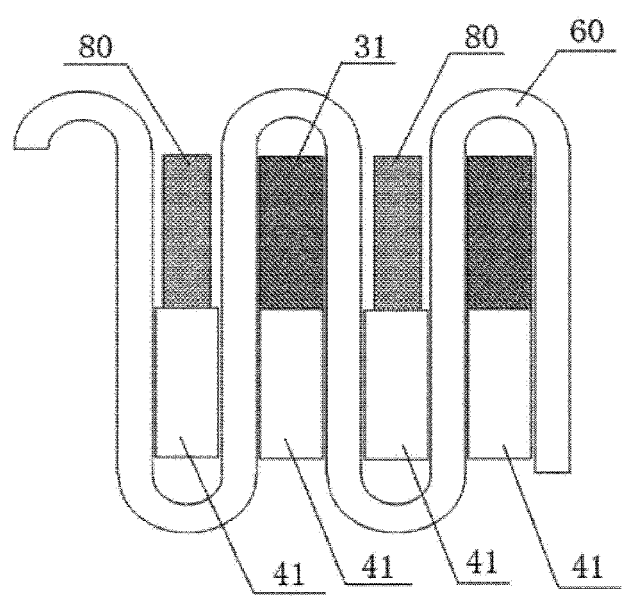
FIG. 4 illustrates another connection method of the elastic element of the unidirectional clutch decoupling device according to an embodiment of the present patent application.

Please refer to FIG. 3 and FIG. 4, a plurality of cushion blocks 80 are arranged in the serpentine spring 60 according to an embodiment of the present patent application. Referring to FIG. 3, the number of the convex plates 41 of the shaft sleeve 40 is the same as the number of the convex plates 31 of the outer ring 30. The convex plates 41 of the shaft sleeve 40 are respectively arranged in the U unit formed by the serpentine spring 60.

In another embodiment, the number of the convex plates 41 of the shaft sleeve 40 is double the number of the convex plates 31 of the outer ring 30, as shown in FIG. 4. A convex plate 41 of the shaft sleeve corresponds to a convex plate 31 of the outer ring and a cushion block 80. The cushion blocks 80 are distributed alternately in the serpentine spring 60. The cushion blocks 80 are used for adjusting the deformation range of the serpentine spring 60, thereby the efficiency of vibration absorption and operation life of the serpentine spring is improved. In addition to the alternate distribution, each of the cushion blocks 80 can also be arranged between an adjacent convex plate 31 and convex plate 41. The materials of cushion blocks 80 can be at least one selected from the group includes plastic, composite material, and metal material.

The unidirectional clutch decoupling device in the present patent application further includes two antifriction bearings 70. Two antifriction bearings 70 are respectively arranged on the ends of the unidirectional clutch decoupling device. The friction spring 20, the outer ring 30, the serpentine spring 60 and the shaft sleeve 40 are arranged between the two antifriction bearings 70. The outer surface of the antifriction bearings 70 contacts with the inner surface of the belt wheel 10. The inner surface of the antifriction bearings 70 contacts with the shaft sleeve 40. Due to the antifriction bearings 70, the belt wheel 10 can rotate around the shaft sleeve 40. It avoids the stuck phenomena of the unidirectional clutch decoupling device during its operation.

Compared with the existing technology, the unidirectional clutch decoupling device in the present patent application transfers torque and eliminates vibration by a serpentine spring. The structure is simple. It greatly reduces the difficulties of manufacturing process. The outer ring is a connecting piece between the friction spring and the shaft sleeve. A groove is set in the outer surface of the outer ring and used to embed and fix the friction spring. The processing step of milling the inner surface of T wheel to a spiral stair can be avoided. The materials of the outer ring can be at least one selected from the group includes plastic, composite material, and metal material. Compared with the existing technology, the processing method is simpler and the manufacturing cost reduces greatly. In addition, in the existing technology, one end of the unidirectional clutch decoupling device is a metal antifriction bearing and the other end of the unidirectional clutch decoupling device is plastic support. Since the tolerances of the metal and plastic are inconformity, the unidirectional clutch decoupling device wears out easily when rotating. Two ends of the unidirectional clutch decoupling device in the present patent application are metal bearings. The stress of the two ends is distributed evenly. Compared with the existing technology, the unidirectional clutch decoupling device in the present patent application has a longer operation life of and reliable quality.

Although the patent application has been described with respect to certain embodiments, the description is not regarded as limiting of the patent application. The alternative changes or modifications of aspects of the embodiments of the patent application fall within the spirit of the present patent application.

What is claimed is:
1. A unidirectional clutch decoupling device for transferring torque between a belt wheel and a shaft comprising:
   a friction spring which is combined with an inner surface of the belt wheel in a rubbing mode;
   an outer ring which is arranged in a space formed by the friction spring;
   a shaft sleeve which is used for accommodating the shaft; and an elastic unit which is located between the outer ring and the shaft sleeve and used for transferring torque of the outer ring to the shaft sleeve;

wherein a relative position of the outer ring and the friction spring is fixed; and the relative position of the shaft sleeve and the shaft is fixed; and wherein when the outer ring drives the shaft sleeve to rotate, the elastic unit reduces or eliminates rotation vibration of the outer ring and the shaft sleeve through deformation;

wherein an inner surface of the outer ring comprises a plurality of convex plates; an outer surface of the shaft sleeve comprises a plurality of convex plates; the elastic unit is fixed by the convex plates of the outer ring and the convex plates of the shaft sleeve;

wherein the elastic unit is a serpentine spring;

wherein the outer surface of the outer ring comprises a groove which is used for accommodating an end of the friction spring which bends inwards;

wherein the belt wheel rotates relative to the shaft sleeve through two antifriction bearings, the two antifriction bearings are respectively arranged on both ends of the unidirectional clutch decoupling device;

wherein the outer ring comprises a step for blocking the friction spring;

wherein the end of the friction spring which bends inwards contacts with the elastic unit and is used for transferring torque from the inner surface of the belt wheel to the elastic unit; and wherein the outer ring is made of at least one from the group comprising plastic, composite material or metal material.

2. The unidirectional clutch decoupling device of claim 1, further comprises at least one cushion block located between the outer ring and the shaft sleeve; and the cushion block is used for adjusting a deformation range of the elastic unit.

3. The unidirectional clutch decoupling device of claim 1, wherein the convex plate of the outer ring axially parallels to the convex plate of the shaft sleeve.

4. The unidirectional clutch decoupling device of claim 3, wherein the elastic unit is made of a metal strip which bends along a first direction of a plane and a second opposite the first direction along a plane, each of the convex plates of the outer ring and each of the convex plates of the shaft sleeve are arranged in a U unit of the elastic unit.

5. The unidirectional clutch decoupling device of claim 4, further comprises at least one cushion block located between the outer ring and the shaft sleeve, the number of the convex plates of the shaft sleeve is double the number of the convex plates of the outer ring, and each of the convex plates of the outer ring and each of the cushion blocks are alternately arranged in each two adjacent U unit; wherein the cushion block is made of at least one from the group comprising plastic, composite material or metal material.

6. The unidirectional clutch decoupling device of claim 4, wherein the number of the convex plates of the shaft sleeve is equal to the number of the convex plates of the outer ring; each of the convex plates of the shaft sleeve and each of the convex plates of the outer ring are arranged in one of two adjacent U units and the cushion block is arranged in another one of two adjacent U units.

7. A unidirectional clutch decoupling device for transferring torque between a belt wheel and a shaft comprising:

a friction spring which is combined with an inner surface of the belt wheel in a rubbing mode;

an outer ring which is arranged in a space formed by the friction spring;

a shaft sleeve which is used for accommodating the shaft; and an elastic unit which is located between the outer ring and the shaft sleeve and used for transferring torque of the outer ring to the shaft sleeve;

wherein a relative position of the outer ring and the friction spring is fixed; and the relative position of the shaft sleeve and the shaft is fixed; and wherein when the outer ring drives the shaft sleeve to rotate, the elastic unit reduces or eliminates rotation vibration of the outer ring and the shaft sleeve through deformation.

8. The unidirectional clutch decoupling device of claim 7, wherein an inner surface of the outer ring comprises a plurality of convex plates; an outer surface of the shaft sleeve comprises a plurality of convex plates; the elastic unit is fixed by the convex plates of the outer ring and the convex plates of the shaft sleeve.

9. The unidirectional clutch decoupling device of claim 7, wherein the elastic unit is a serpentine spring.

10. The unidirectional clutch decoupling device of claim 7, wherein the outer surface of the outer ring comprises a groove which is used for accommodating an end of the friction spring which bends inwards.

11. The unidirectional clutch decoupling device of claim 7, further comprises at least one cushion block located between the outer ring and the shaft sleeve; and the cushion block is used for adjusting a deformation range of the elastic unit.

12. The unidirectional clutch decoupling device of claim 8, wherein the convex plate of the outer ring axially parallels to the convex plate of the shaft sleeve.

13. The unidirectional clutch decoupling device of claim 12, wherein the elastic unit is made of a metal strip which bends along a first direction of a plane and a second opposite the first direction along a plane, each of the convex plates of the outer ring and each of the convex plates of the shaft sleeve are arranged in a U unit of the elastic unit.

14. The unidirectional clutch decoupling device of claim 13, further comprises at least one cushion block located between the outer ring and the shaft sleeve, the number of the convex plates of the shaft sleeve is double the number of the convex plates of the outer ring, and each of the convex plates of the outer ring and each of the cushion blocks are alternately arranged in each two adjacent U unit.

15. The unidirectional clutch decoupling device of claim 13, wherein the number of the convex plates of the shaft sleeve is equal to the number of the convex plates of the outer ring; each of the convex plates of the shaft sleeve and each of the convex plates of the outer ring are arranged in one of two adjacent U units and the cushion block is arranged in another one of two adjacent U units.

16. The unidirectional clutch decoupling device of claim 11, wherein the cushion block is made of at least one from the group comprising plastic, composite material or metal material.

17. The unidirectional clutch decoupling device of claim 7 wherein the belt wheel rotates relative to the shaft sleeve through two antifriction bearings, the two antifriction bearings are respectively arranged on both ends of the unidirectional clutch decoupling device.

18. The unidirectional clutch decoupling device of claim 7, wherein the outer ring comprises a step for blocking the friction spring.

19. The unidirectional clutch decoupling device of claim 10, wherein the end of the friction spring which bends inwards contacts with the elastic unit and is used for transferring torque from the inner surface of the belt wheel to the elastic unit.

20. The unidirectional clutch decoupling device claim 7, wherein the outer ring is made of at least one from the group comprising plastic, composite material or metal material.

* * * * *